(12) United States Patent
Ravazza

(10) Patent No.: US 11,318,918 B2
(45) Date of Patent: May 3, 2022

(54) WHEELED CART THAT CAN BE AFFIXED TO A VEHICLE'S WHEEL HOLDER

(71) Applicant: Carlos Daniel Ravazza, Sunny Isles Beach, FL (US)

(72) Inventor: Carlos Daniel Ravazza, Sunny Isles Beach, FL (US)

( * ) Notice: Subject to any disclaimer, the term of this patent is extended or adjusted under 35 U.S.C. 154(b) by 43 days.

(21) Appl. No.: 16/876,065

(22) Filed: May 17, 2020

(65) Prior Publication Data

US 2020/0361427 A1    Nov. 19, 2020

(30) Foreign Application Priority Data

May 17, 2019    (AR) .............................. P20190101329

(51) Int. Cl.
| | | |
|---|---|---|
| *B60S 9/22* | (2006.01) | |
| *B62B 3/04* | (2006.01) | |
| *B62B 3/10* | (2006.01) | |
| *B62B 5/00* | (2006.01) | |
| *B62B 3/02* | (2006.01) | |

(52) U.S. Cl.
CPC ................. *B60S 9/22* (2013.01); *B62B 3/02* (2013.01); *B62B 3/04* (2013.01); *B62B 3/10* (2013.01); *B62B 5/0083* (2013.01); *B62B 2202/90* (2013.01)

(58) Field of Classification Search
CPC ...... B60S 9/22; B60S 9/02; B60S 9/14; B60S 13/00; B62B 3/02; B62B 3/04; B62B 3/10; B62B 5/0083; B62B 2202/90
See application file for complete search history.

(56) References Cited

U.S. PATENT DOCUMENTS

| | | | | |
|---|---|---|---|---|
| 1,650,031 | A * | 11/1927 | Nash ........................ | B60S 13/00 414/428 |
| 3,317,218 | A * | 5/1967 | Rivolta .................... | B60S 13/00 280/767 |
| 5,180,177 | A * | 1/1993 | Maki ..................... | B25H 1/0007 248/352 |
| 7,543,830 | B2 * | 6/2009 | Symiczek ............... | B60S 13/00 280/79.11 |

* cited by examiner

*Primary Examiner* — John D Walters
(74) *Attorney, Agent, or Firm* — Nancy J. Flint, Attorney At Law, P.A.; Nancy J. Flint, Esq.

(57) ABSTRACT

A Wheeled Cart which can be connected to the car's own wheel, allowing, upon removal of the car wheel, the positioning of the Wheeled Cart with the same screws or the same nuts. The device adapts to different configurations of the wheel and fastens taking into account the layout or configuration of the holes, as well as the diameter of the wheel to be replaced. The device enables movement of the car when the latter cannot do so with its wheels.

2 Claims, 2 Drawing Sheets

WHEELED CART THAT CAN BE AFFIXED TO A VEHICLE'S WHEEL HOLDER

FIELD OF THE INVENTION

The invention relates to a Wheeled Cart that can be attached to a vehicle, such as a car, in the same manner as the wheels of the vehicle. The Wheeled Cart can be positioned on the vehicle using the same screws and/or nuts as the wheels of the vehicle. The Wheeled Cart is fitted on wheels and can be adapted to different configurations of wheel attachments on vehicles.

BRIEF SUMMARY OF THE INVENTION

This invention patent application refers to a WHEELED CART THAT CAN BE AFFIXED TO A VEHICLE'S WHEEL HOLDER, with the premise that the wheeled cart and the car's own wheel may be attached in the same manner as the Wheeled Cart. Upon removal of the car's wheel, the Wheeled Cart may be positioned with the same screws or the same nuts as are the car's wheel, with no need to make any adaptations.

The device is fitted on wheels and may be adapted to different configurations of attachment of wheels on wheel holders of a vehicle, whether the attachment be single-screwed, single-nutted, or multiple screws or nuts. In every respect, the chassis or main body must regulate the layout or configuration of the holes as well as the diameter of the wheel to be replaced.

The objective of the Wheeled Cart is to enable the possibility of moving a vehicle, such as a car, when it cannot do so with its wheels, whether when its wheels have a deflated tire, or when the axis that allows the wheel to turn is broken or has a mechanical difficulty which impedes it from turning.

The Wheeled Cart comprises an articulated chassis body, which includes two 360° directional wheels. This articulated body fulfils two functions: the first function is that it is articulated to be connected with at least two screws or two nuts to the wheel holder. The second function is that once at least two screws have been put into place, it is able to regulate the distance between the center of the wheel holder and the support plane of the two 360° directional wheels on which the Wheeled Cart is fitted. In this way, the chassis of the Wheeled Cart has two parts connected by a bolt or other component replacing the bolt, allowing it to be coupled and uncoupled so that the link between the two parts that make up the chassis may rotate on the axis of the bolted connection or other element replacing the bolt.

In this way a necessary movement to meet the requirements is achieved: a scissor-type movement of the chassis of the Wheeled Cart, given that the constituent elements pivot around the bolted connection or other element replacing the bolt, whereby, upon doing so, two ends of the Wheeled Cart chassis move towards each other and the other ends move away from each other.

DETAILED DESCRIPTION OF THE INVENTION

Figure 1:
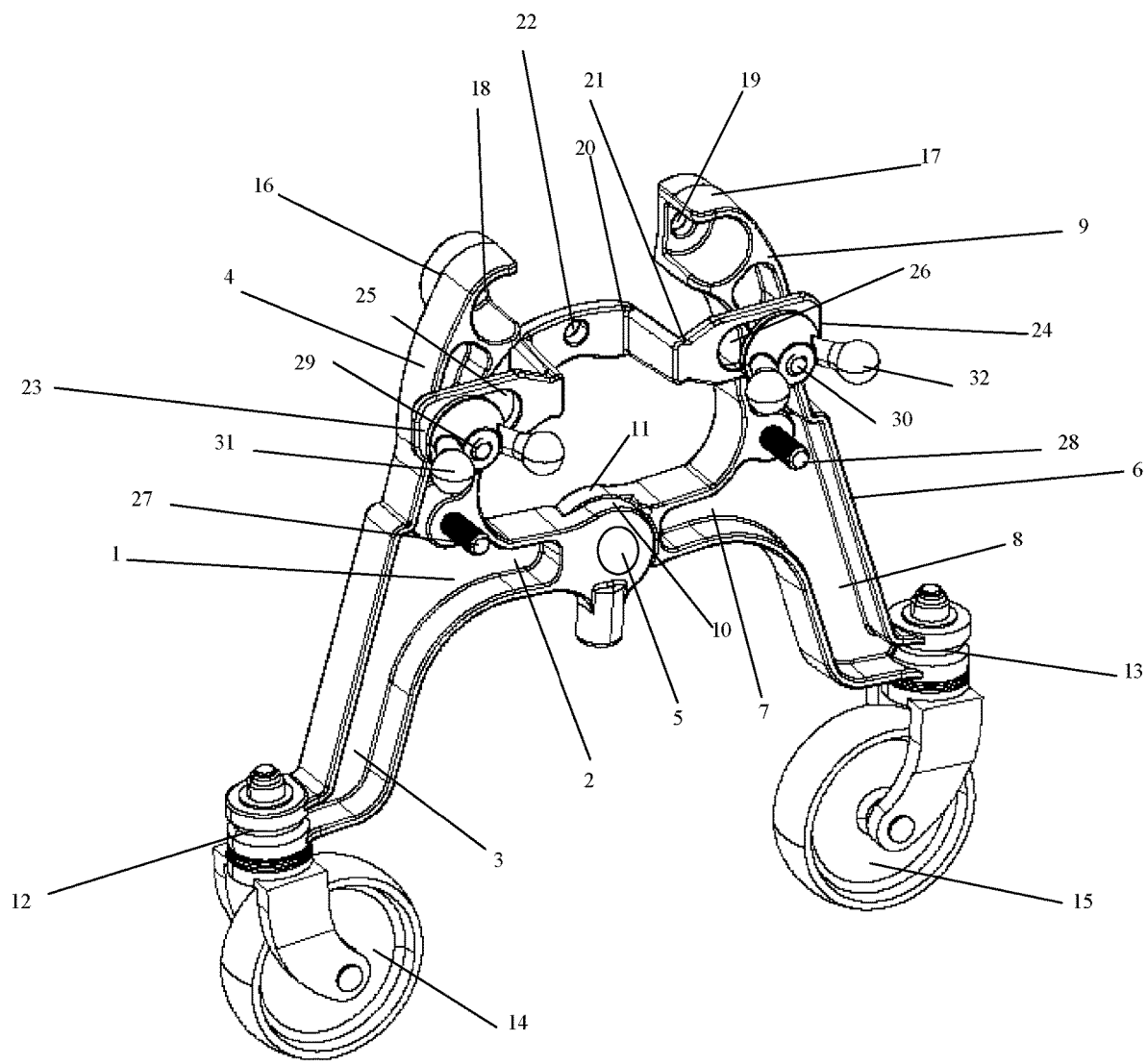
FIG. 1 depicts a perspective view of the Wheeled Cart.

A Wheeled Cart that can be attached to a vehicle's own wheel in the same manner as the vehicle's own wheel is disclosed, wherein the Wheeled Cart is positioned with the same screws or the same nuts as are the car's wheel, with no need to make any adaptations. The Wheeled Cart adapts to different configurations of attachment of a vehicle's wheel whether they be single-screwed, single-nutted, or multiple screws or nuts. The chassis or main body of the vehicle must regulate the layout or configuration of the holes as well as the diameter of the wheel to be replaced. The Wheeled Cart enables the movement of a vehicle, such as a car, when it cannot move with its wheels, whether when its wheels have a deflated tire, or when the axis that allows the wheel to turn is broken or has a mechanical difficulty which impedes the vehicle's wheel from turning.

The Wheeled Cart comprises a chassis body having a left arm and a right arm, wherein each arm has a center part, an inferior end proximal the ground and a distal end. Each of the left arm and the right arm in approximately the mid-section have a fork that extend toward each other, each fork accommodating a bolt bushing or other attachment. At the end of each arm proximal the ground, each arm has an orifice through which screws can pass in order to accommodate attachment of 360° directional wheels. At the distal end of each arm, each arm has an orifice through which screws of the wheel holder can pass.

Additionally, the Wheeled Cart has a third fastening element that has a longitudinal body and a depression in its central part. The third fastening element has a through-hole in its central part and a lateral orifice near each end of the third fastening element. Screws of the wheel holder can pass through the through-hole. A pair of threaded pins extend from the surface of each of the left arm and right arm that are disposed between the fork of each arm and the proximal end of each arm, wherein the pair of threaded pins comprise an upper threaded pin and a lower threaded pin. The upper threaded pin of each arm corresponds laterally to the upper threaded pin of the other arm, and the lower threaded pin of each arm corresponds laterally to the lower threaded pin of the other arm. The third fastening element can be attached to the left arm and the right arm by placing the lateral orifices over either the upper threaded pins of each arm or the lower threaded pins and attaching the third fastening element to the left arm and right arm of the Wheeled Cart using wing nuts.

In use, screws from the wheel holder are introduced in the orifices in the proximal end of each of the left arm and the right arm. The third fastening element can then be connected to either the upper threaded pins or the lower threaded pins of each of the left arm and the right arm, depending on the configuration of the wheel and the vehicle. The third fastening element is then affixed to each of the left arm and the right arm by affixing wing nuts to the threaded pins, thus connecting the Wheeled Cart to the wheel holder.

A scissor-type movement of the chassis of the Wheeled Cart is effectuated, given that the constituent elements pivot around the bolted connection or other element replacing the bolt, whereby, upon doing so, two ends of the Wheeled Cart chassis move towards each other and the other ends move away from each other. Once each of the proximal ends of the Wheeled Cart is positioned on the wheel holder, the distal ends, each of which comprises a 360° directional wheel, can be moved towards or away from each other, by sliding the bolt connection or other element replacing the bolt until the desired distance between the support plane of the two 360° directional wheels and the center of the wheel holder is reached.

Turning to the figures, FIG. 1 depicts a lateral perspective view of the Wheeled Cart, in which can be seen a left arm (1), the left arm (1) having a left fork (2), a left distal end (3)

and a left proximal end (4). Also seen are a right arm (6), the right arm (6) having a right fork (7), a right distal end (8) and a right proximal end (9). The left arm (1) and the right arm (6) are connected by means of a Bolt Bushing (5). Left fork (2) and right fork (7) include a left fork end (10) and a right fork end (11) which accommodate the Bolt Bushing (5). Left proximal end (4) includes left proximal accommodation (16) having left orifice (18) and right proximal end (9) includes right proximal accommodation (17) having right orifice (19) through which screws of the wheel holder can pass. Left distal end (3) includes left distal accommodation (12) and right distal end (8) includes right distal accommodation (13) which contain left 360° Directional Wheel (14) and right Directional Wheel (15). Lastly, Third Fastening Element (20) is composed of a longitudinal body (21) with a depression in its central part, with a through-hole (22) which has a left sliding Orifice (25) and a right sliding orifice (26) near left end (23) and right (24), respectively. lower left screw (27) and lower right screw (28), or upper left screw (29) and upper right screw (30) respectively, located on the surface of left proximal end (4) and right proximal end (9), respectively, are inserted into left sliding orifice (25) and right sliding orifice (26) to affix Third Fastening Element (20) by means of first Wing Nut (31) and second wing nut (32) to the Wheeled Cart.

Figure 2:
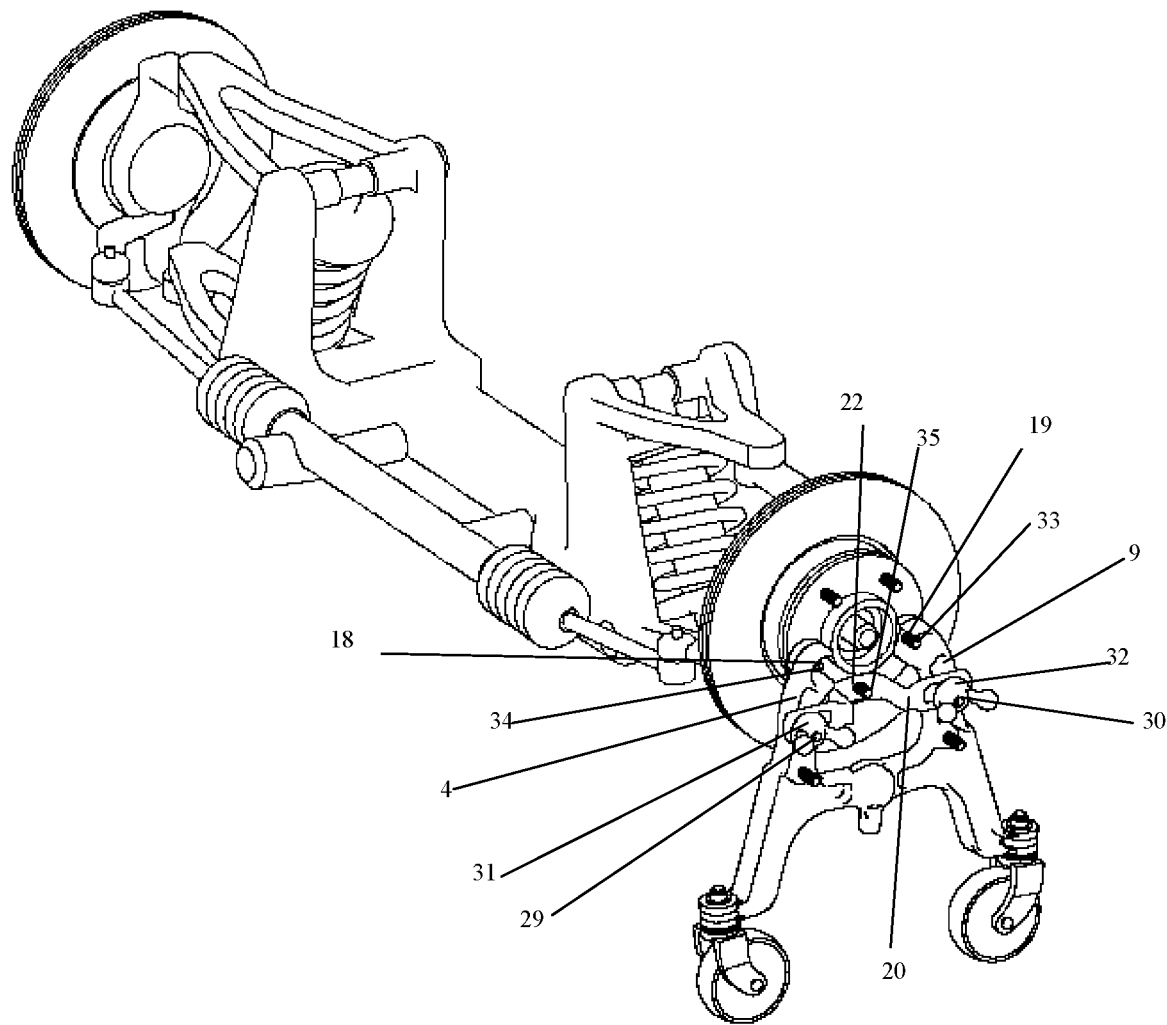
FIG. 2 depicts the Wheeled Cart as attached to the wheel of a vehicle.

Turning to FIG. 2, the Wheeled Cart is presented when in use, wherein wheel screws from the wheel holder (33), (34) and (35) are introduced in left orifice (18) and right orifice (19) of left proximal end (4) and right proximal end (9). Third Fastening Element (20) is connected to the Wheeled Cart in this embodiment by upper left screws (29) and upper right screw (30) to left proximal ends (4) and right proximal end (9) and affixed by first Wing Nuts (31) and second wing nut (32). Wheeled Cart is thus connected to the wheel holder by wheel screws (33), (34) and (35) inserted through left orifice (18), right orifice (19) and through-hole (22).

The invention claimed is:

1. A wheeled cart for attachment to the wheels of a vehicle, comprising:
    a chassis body, the chassis body having a left arm and a right arm; and
    a third fastening element,
    wherein the left arm comprises a left center part, a left inferior end proximal the ground and a left distal end, wherein the left arm comprises a left orifice at the proximal end, wherein the left arm further comprises a 360° directional wheel attached at a bottom of the left distal end, wherein the left arm further comprises an upper threaded pin extending from a surface of the left arm and a lower threaded pin extending from the surface of the left arm, wherein the upper threaded pin is located between the mid-section of the left arm and the proximal end and the lower threaded pin is located between the upper threaded pin and the mid-section of the left arm, wherein the left arm further comprises a left fork approximately mid-section of the left arm, wherein further the left fork comprises a left fork end proximal the left arm, wherein further left fork end comprises a left fork orifice,
    wherein the right arm comprises a right center part, a right inferior end proximal the ground and a right distal end, wherein the right arm comprises a right orifice at the proximal end, wherein the right arm further comprises a 360° directional wheel attached at a bottom of the right distal end, wherein the right arm further comprises an upper threaded pin extending from a surface of the right arm and a lower threaded pin extending from the surface of the right arm, wherein the upper threaded pin is located between the mid-section of the right arm and the proximal end and the lower threaded pin is located between the upper threaded pin and the mid-section of the right arm, wherein the right arm further comprises a right fork approximately mid-section of the right arm, wherein further the right fork comprises a right fork end proximal the right arm, wherein further right fork end comprises a right fork orifice,
    wherein the right fork and the left fork are attached by placement of an articulable attachment device through the left fork orifice and the right fork orifice, wherein the articulable attachment device allows articulation of the left arm and the right arm,
    wherein the third fastening element comprises a longitudinal body, wherein the third fastening element further comprises a lateral orifice at each end proximal each of the left arm and the right arm, and further comprises a depression in a central part of the longitudinal body, wherein the third fastening element further comprises a through-hole in the central part,
    wherein the third fastening element is attached to the chassis body by insertion of either the left upper threaded pin and the right upper threaded pin, or else insertion of the lower left threaded pin and the right lower threaded pin, through the lateral orifices, wherein a left wing nut and a right wing nut are attached to either the left upper threaded pin and the right upper threaded pin, or else insertion of the lower left threaded pin and the right lower threaded pin, to secure the third fastening element to the chassis body.

2. A method of securing the wheeled device of claim 1 to a wheel of a vehicle, comprising:
    introducing a first screw extending from a wheel holder of the vehicle into the left orifice and securing the first screw to the left arm;
    thereafter articulating the left arm and the right arm of the wheeled device such that the right orifice meets a second screw extending from the wheel holder of the vehicle;
    thereafter introducing the second screw into the right orifice and securing the second screw to the right arm;
    thereafter inserting a third screw extending from the wheel holder of the vehicle into the through-hole of the third fastening element and securing the third screw to the third fastening element;
    thereafter affixing the third fastening element to the wheel holder by inserting either the upper left threaded pin and the upper right threaded pin into the left orifice and the right orifice, or else inserting the lower left threaded pin and the lower right threaded pin into the left orifice and the right orifice and securing the third fastening element by placing the left wing nut on either the upper left threaded pin or the lower left threaded pin, and placing the right wing nut on either the upper right threaded pin or the lower right threaded pin.

* * * * *